(12) United States Patent
Schoeb et al.

(10) Patent No.: US 9,557,023 B2
(45) Date of Patent: Jan. 31, 2017

(54) INDIRECT DAYLIGHTING DEVICE (75) Inventors: Gerard James Schoeb, West Olive, MI (US); Johnny Wilmer Campbell, Byron Center, MI (US); Jeffrey Brian McGinness, Grand Rapids, MI (US)

(73) Assignee: TUBELITE, INC., Walker, MI (US)

( * ) Notice: Subject to any disclaimer, the term of this patent is extended or adjusted under 35 U.S.C. 154(b) by 1161 days.

(21) Appl. No.: 13/294,810

(22) Filed: Nov. 11, 2011

(65) Prior Publication Data

US 2012/0243236 A1 Sep. 27, 2012

Related U.S. Application Data (60) Provisional application No. 61/413,921, filed on Nov. 15, 2010.

(51) Int. Cl.
*F21V 7/00* (2006.01)
*H05B 35/00* (2006.01)
*F21S 11/00* (2006.01)

(52) U.S. Cl.
CPC ............ *F21S 11/00* (2013.01); *F21V 7/0008* (2013.01)

(58) Field of Classification Search
CPC combination set(s) only.
See application file for complete search history.

(56) References Cited

U.S. PATENT DOCUMENTS

| | | | |
|---|---|---|---|
| 3,642,557 A | 2/1972 | Warp | |
| 4,378,925 A | 4/1983 | Griffin | |
| 4,509,825 A * | 4/1985 | Otto | F21S 11/00 160/236 |
| 4,820,020 A * | 4/1989 | Terrill | E04D 13/03 359/592 |
| 4,883,340 A * | 11/1989 | Dominguez | F21S 11/00 126/576 |
| 5,204,777 A * | 4/1993 | Curshod | E04D 13/033 359/596 |
| 5,980,052 A * | 11/1999 | Thor | F21S 11/00 126/573 |
| 5,984,486 A | 11/1999 | Munz et al. | |
| 6,134,842 A | 10/2000 | Cheng et al. | |
| 6,239,910 B1 * | 5/2001 | Digert | E06B 9/28 160/104 |
| 6,431,247 B1 * | 8/2002 | Harrison, Jr. | E06B 9/323 160/168.1 R |
| 6,480,336 B2 | 11/2002 | Digert et al. | |
| 6,714,352 B2 | 3/2004 | Rogers et al. | |
| 6,988,525 B2 | 1/2006 | Moulton | |
| 7,070,314 B2 | 7/2006 | Edmonds | |

(Continued)

FOREIGN PATENT DOCUMENTS

| | | |
|---|---|---|
| EP | 2003475 | 12/2008 |
| JP | 6111942 | 4/1994 |

(Continued)

*Primary Examiner* — Donald Raleigh
(74) *Attorney, Agent, or Firm* — Dorsey & Whitney LLP (57) ABSTRACT

An indirect daylighting device for a building with an interior space may include a suspension system configured for securing to a building structure and a pan secured to the suspension system and having an incident surface and a cross-sectional profile forming a plurality of waves, wherein the incident surface is arranged to receive natural light entering a building and reflect the natural light to provide indirect lighting to the interior space of the building.

30 Claims, 7 Drawing Sheets

(56) References Cited

U.S. PATENT DOCUMENTS

| | | |
|---|---|---|
| 7,537,041 B2 | 5/2009 | Spencer |
| D595,887 S | 7/2009 | Blom |
| 2001/0019451 A1 | 9/2001 | Digert et al. |
| 2003/0112518 A1 | 6/2003 | Rogers et al. |
| 2004/0201977 A1 | 10/2004 | Edmonds |
| 2004/0256062 A1* | 12/2004 | Moulton .................. E06B 9/42 160/89 |
| 2006/0085170 A1 | 4/2006 | Glaser et al. |
| 2006/0288645 A1 | 12/2006 | Konstantino et al. |
| 2008/0121348 A1 | 5/2008 | Spencer |
| 2008/0202703 A1 | 8/2008 | Edmonds |
| 2008/0271856 A1 | 11/2008 | Paulussen et al. |
| 2010/0254011 A1* | 10/2010 | Griffiths .................. E06B 9/28 359/597 |
| 2011/0214364 A1* | 9/2011 | Fuller ......................... 52/173.3 |
| 2012/0033301 A1* | 2/2012 | Schmaelzle ................ F24J 2/06 359/592 |

FOREIGN PATENT DOCUMENTS

| | | |
|---|---|---|
| JP | 8246766 | 9/1996 |
| JP | 2000213255 | 8/2000 |
| JP | 2000228107 | 8/2000 |
| JP | 2000285710 | 10/2000 |
| JP | 2001003661 | 1/2001 |
| JP | 2001060407 | 3/2001 |
| JP | 2003240302 | 8/2003 |
| JP | 2005023592 | 1/2005 |
| JP | 2006222011 | 8/2006 |
| JP | 2006313360 | 11/2006 |
| WO | WO 00/47859 | 8/2000 |
| WO | WO 2006/123283 | 11/2006 |
| WO | WO 2006/135819 | 12/2006 |
| WO | WO 2008/096176 | 8/2008 |
| WO | WO 2008/135893 | 11/2008 |

* cited by examiner

INDIRECT DAYLIGHTING DEVICE

CROSS-REFERENCE TO RELATED APPLICATIONS

The present application claims priority to U.S. Provisional Patent Application No. 61/413,921 entitled Indirect Daylighting Device, the content of which is hereby incorporated by reference herein in its entirety.

FIELD OF THE INVENTION

The present disclosure relates to devices for providing indirect natural light within the interior of a building. More particularly, the present disclosure relates to an architectural light shelf for interior daylighting of a building.

BACKGROUND OF THE INVENTION

Operation of buildings is a significant contributor to emissions into our atmosphere. Building operations account for a large percentage of our energy use and of our carbon-based emissions. In response to these concerns as well as rising energy costs, building designers continue to look for more energy efficient systems to facilitate building operation. Moreover, certifications such as Leadership in Energy and Environmental Design (LEED) have enticed designers and building owners to entertain alternatives to conventional building operations.

Daylighting is one aspect of this movement and involves efforts to rely on natural light to illuminate the interior of a building. Daylighting efforts may include strategically placing windows, doors, and other openings. In addition, light shelves may also be used to reflect natural light into an interior space. In most instances, light shelves may be positioned on the interior of a building at a window location. When the light shelf is positioned properly, natural sunlight is directed toward the top surface of the light shelf and reflected upward illuminating the ceiling in the interior building space. Less electrical lighting may thus be used in the spaces where light shelves are utilized and therefore the electrical lighting may be dimmed or turned off to conserve energy.

Current light shelves, however, suffer from several drawbacks. For example, current light shelves may be limited to sizes and arrangements quite closely related to glazing layouts and interior obstruction locations. In addition, known shelves often cause glare and reflect harsh light off interior hard surfaces. This does not create a very aesthetically pleasing appearance. Improvements are needed to further the use of light shelves in the building industry; such as making the design and layout more flexible, creating a more aesthetically pleasing appearance, making the use of natural light more appealing for building occupants, improving the quality of the reflected light, and facilitating ease of fabrication and installation. Improved designs can distribute light more uniformly in a room as well as distribute light greater distances.

BRIEF SUMMARY OF THE INVENTION

In one embodiment, an indirect daylighting device for a building with an interior space may be provided. The device may include a suspension system configured for securing to a building structure. The device may also include a pan secured to the suspension system. The pan may have an incident surface for reflecting light and it may also include a cross-sectional profile forming a plurality of waves. The incident surface of the daylighting device may be arranged to receive natural light entering a building and reflect the natural light to provide indirect lighting to the interior space of the building. The wave profile of the pan may soften the incoming natural light as it reflects it and distributes it throughout the interior space. In addition, the pan may be uninterrupted where it is secured to the suspension system allowing for ease in accommodation of building obstructions.

While multiple embodiments are disclosed, still other embodiments of the present disclosure will become apparent to those skilled in the art from the following detailed description, which shows and describes illustrative embodiments of the disclosure. As will be realized, the various embodiments of the present disclosure are capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

While the specification concludes with claims particularly pointing out and distinctly claiming the subject matter that is regarded as forming the various embodiments of the present disclosure, it is believed that the disclosure will be better understood from the following description taken in conjunction with the accompanying Figures, in which:

DETAILED DESCRIPTION

The present disclosure, in one embodiment, relates to an indirect daylighting device. The device may be in the form of a light shelf for interior daylighting of a building. The light shelf may be positioned adjacent building glazing in the form of curtainwall systems, windows, ribbon window systems, storefronts, clerestories, skylights, or other areas where light may enter a building structure. The light shelf may be installed, for example, on an interior side of the glazing and may be spaced from the top of the glazing thereby intercepting sunlight passing through an upper portion of the glazing. The light shelf may include a surface for receiving and reflecting incoming light thereby shading a portion of the interior of the building from direct sunlight and reflecting the incoming light upward into a building interior space thereby providing indirect lighting.

While the present disclosure relates to a daylighting device in the form of a light shelf positioned inside a building, the device may be provided in several forms. For example, the device may be a shelf positioned outside a building and arranged to receive direct sunlight and reflect the light through a window or other opening and into an interior space. In other embodiments the device may be a ledge incorporated into a building structure or attached thereto. In still other embodiments, the device may be a platform supported off of legs or suspended by ropes, cables, or other elements in a space. The device may have any shape including flat, round, cylindrical, curvilinear, or rectilinear. In addition, the surface of the device may be relatively smooth or flat, or the surface may be jagged, serrated, segmented, textured, or otherwise treated to disperse or distribute light. In some embodiments, the device may be positioned adjacent openings other than windows. For example, a cloud like daylighting device may be suspended or arranged to receive light from a skylight or other building opening. Other arrangements and types of daylighting devices may also be used.

Figure 1:
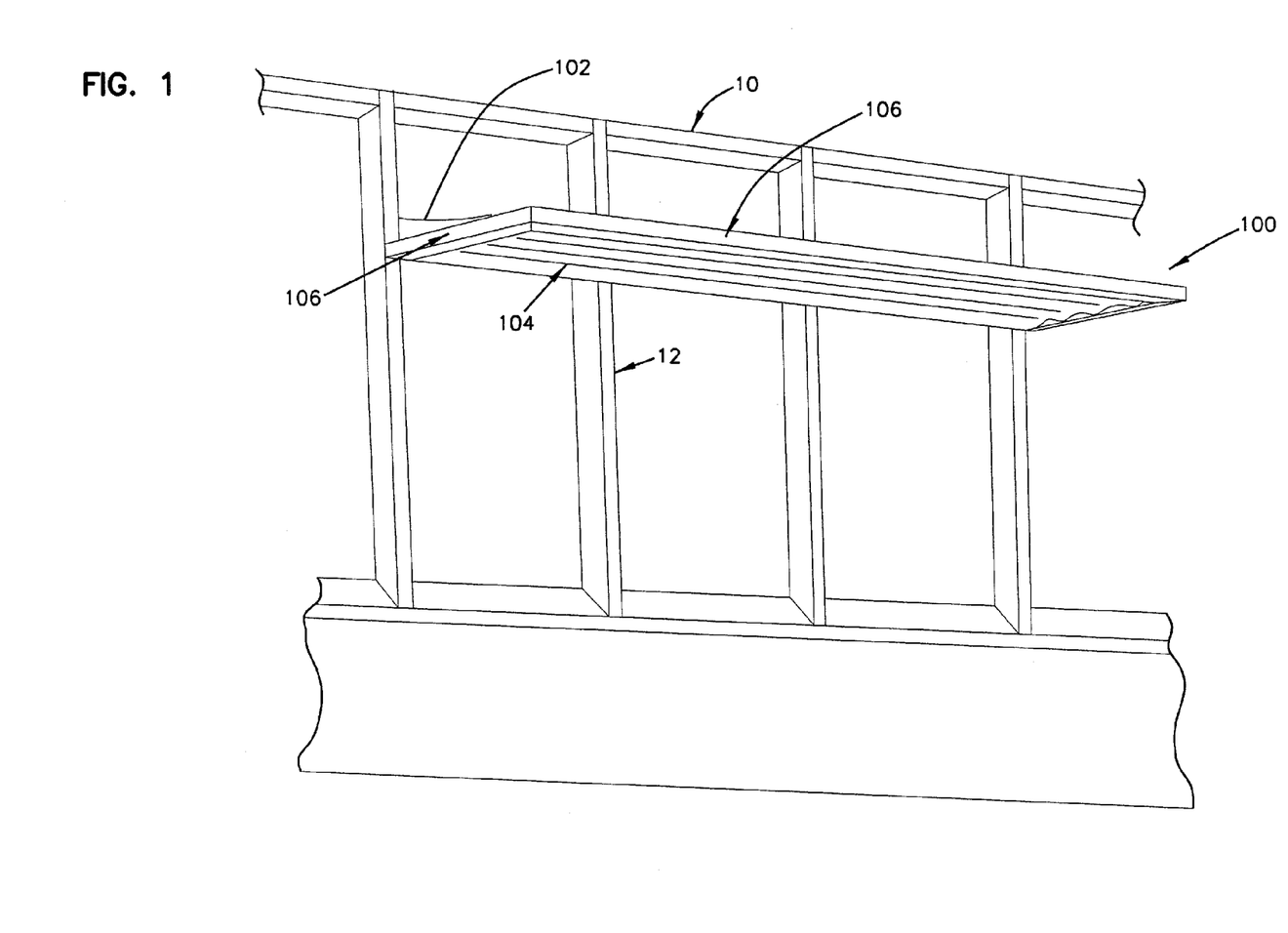
FIG. 1 is a perspective interior view of a wall system having a light shelf positioned adjacent thereto according to one embodiment.

With reference to FIG. 1, an indirect daylighting device in the form of a light shelf 100 is shown. The light shelf 100 shown is positioned adjacent an interior side of building glazing 10 in the form of a curtainwall. The light shelf 100 is arranged generally horizontally at transom height and projects toward the inside of the building by being fastened to vertically extending mullions 12. In this arrangement, the light shelf 100 may be configured to receive incoming natural light through an upper portion of the glazing 10 and reflect the natural light upward into a building space providing indirect lighting to the space. The light shelf 100 may be used with all types of fenestration products and may also be mounted vertically in some applications.

Figure 2:
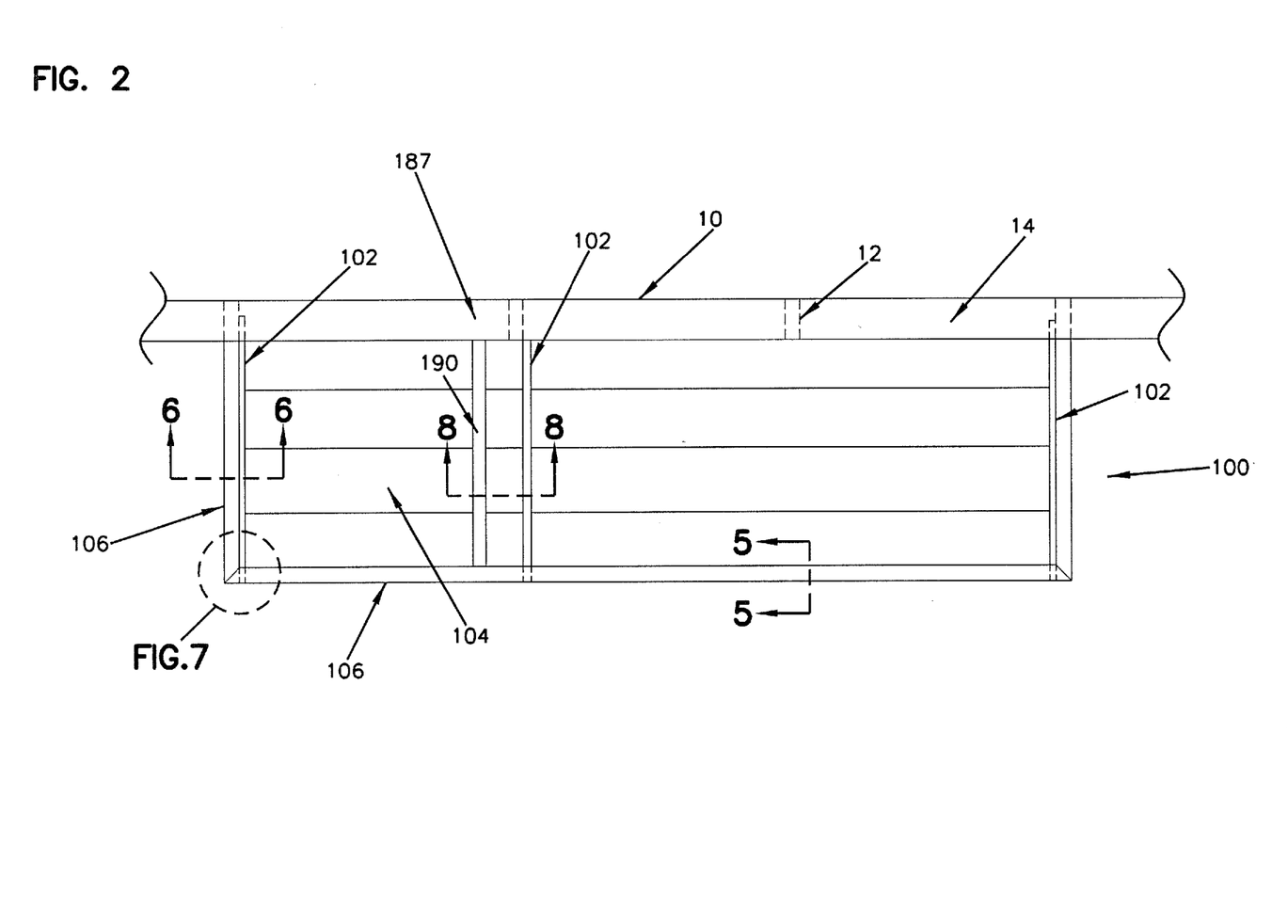
FIG. 2 is a top plan view of the light shelf and window wall of FIG. 1.

With continued reference to FIG. 1 and also with reference to FIG. 2, the light shelf 100 may include a suspension system 102 connected to vertically extending mullions 12 of the glazing 10 and configured to support the light shelf 100. The light shelf 100 may also include a pan 104 having an incident surface arranged to receive and reflect the natural light. The pan 104 may be supported by the suspension system and the light shelf 100 may also include trim elements 106 for providing a clean edge or finish around the perimeter of the shelf 100. Each of the suspension system 102, pan 104, trim elements 106, and the relationships therebetween may be described with reference to FIGS. 3-7.

The suspension system 102 may be configured for arranging the light shelf 100 both with regard to position and orientation. The suspension system 102 may include any type of supporting element including columns, hangers, brackets, ledges, or other known devices for supporting an element in spaced apart relationship from other surfaces, such as walls, floors, and ceilings and openings therein. That is, for example, hangers in the form of wire, string, rope, or other tension resisting device may be secured to a ceiling or upper floor structure for supporting the light shelf in front of a skylight opening in a ceiling or a window opening in a wall. Columns may be in the form of wooden, metal, PVC, plastic, or other material posts. Brackets may include angle brackets for positioning the light shelf as it approaches a surface such as a wall for example. The brackets may include stiffeners or other reinforcing elements. Ledges formed as part of a wall or ceiling system or attached ledges such as elongate wooden, plastic, or other material plates may be fastened to a surface to provide a ledge upon which a portion of the light shelf may rest. Several types of suspension systems 102 for maintaining the position and orientation of the light shelf 100 may be provided.

The suspension system 102 shown in FIGS. 1 and 2 is most akin to a bracket. That is, as shown, the suspension system 102 may be in the form of an inrigger fastened to a portion of a wall system and projecting into an interior space of a building. The inrigger may thus allow the pan portion 104 of the light shelf 100 to be secured thereto thereby maintaining the position and orientation of the light shelf 100. In some embodiments, the inrigger may extend horizontally into the building space, but in other embodiments it may extend at an angle, either upward or downward to the floor. In still other embodiments, the angle of the inrigger may be adjustable and in still further embodiments, the inrigger may be adjustable based on the type of light being projected onto the light shelf 100 and the incident angle thereof. While several embodiments of a suspension system 102 have been mentioned, for purposes of discussion going forward, the suspension system 102 will be referred to as an inrigger 102.

Figure 3:
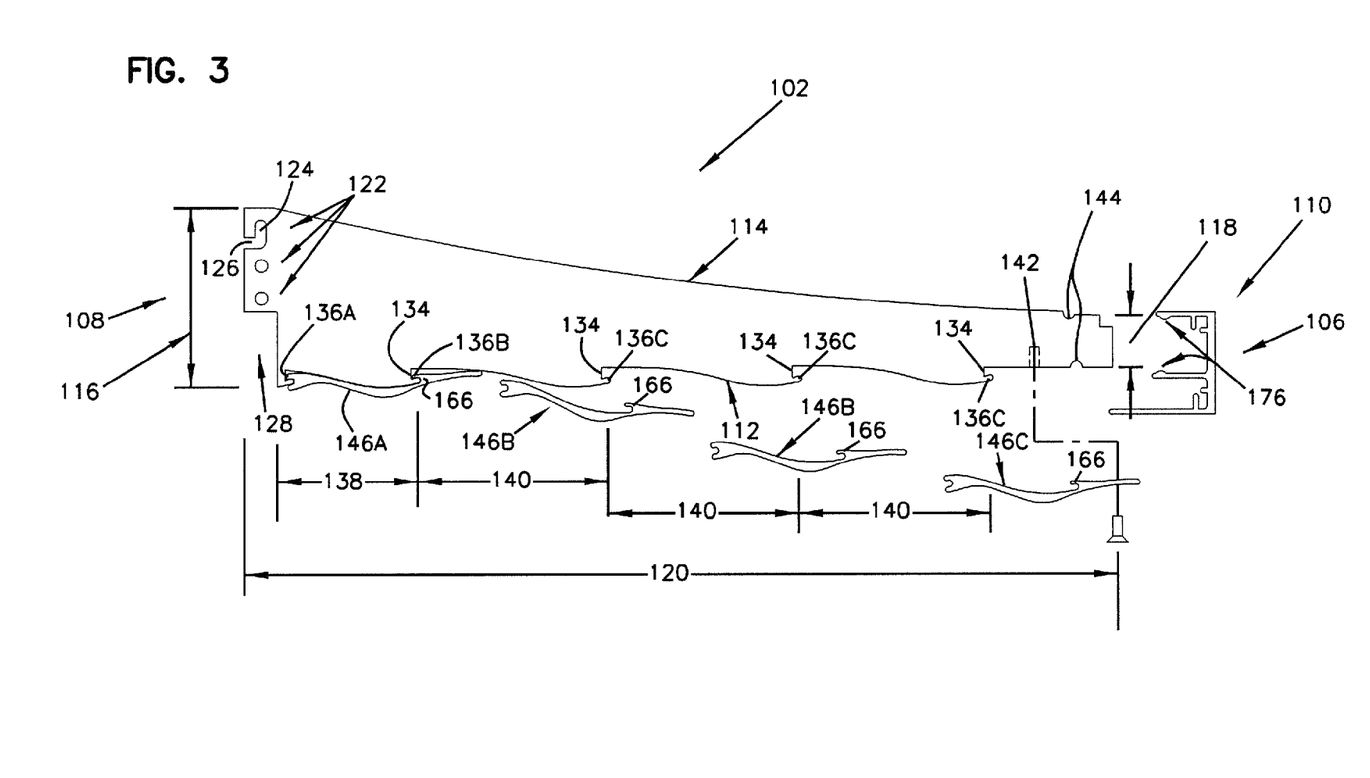
FIG. 3 is an exploded side view of the light shelf of FIG. 1.

Referring now to FIG. 3, a side elevational view of an inrigger 102 is shown. The inrigger 102 may be generally elongate and have a profile as shown with a support end 108 and a free end 110. The inrigger 102 may also include a pan engaging edge 112 and a free edge 114 extending between the ends 108, 110 to complete the profile. The pan engaging edge 112 may extend generally perpendicular relative to the support end 108 and the free end 110. The free edge 114 may slope from the support end 108 to the free end 110 and may include a generally concave shape. As such the profile width 116 at the support end 108 may be larger than the profile width 118 at the free end 110. Other profile shapes for the inrigger 102 may also be provided. The inrigger 102 may include a generally rectangular cross-section and may be generally solid. The cross-section may have a relatively narrow thickness compared to the profile width and, as such, the inrigger 102 may be in the form of an elongate plate. Other cross-sections may also be used and may include square, round, triangular, L-shaped, I-shaped, C-shaped, or other cross-sections and the cross-sections may be hollow such as when a tube or pipe is used. The inrigger 102 may be made from one or more materials including, but not limited to steel, aluminum, alloy, or other metal materials. Other materials may also include composites, plastics, or wood. Still other materials may also be used.

The inrigger 102 may have a length 120 ranging from approximately 6" to approximately 8'. In other embodiments, the inrigger 102 may have a length 120 ranging from approximately 1' to approximately 4'. In still other embodiments, the inrigger 102 may have a length 120 ranging from approximately 18" to approximately 3'. Other inrigger lengths 120 outside the ranges provided may also be used.

Figure 9A:
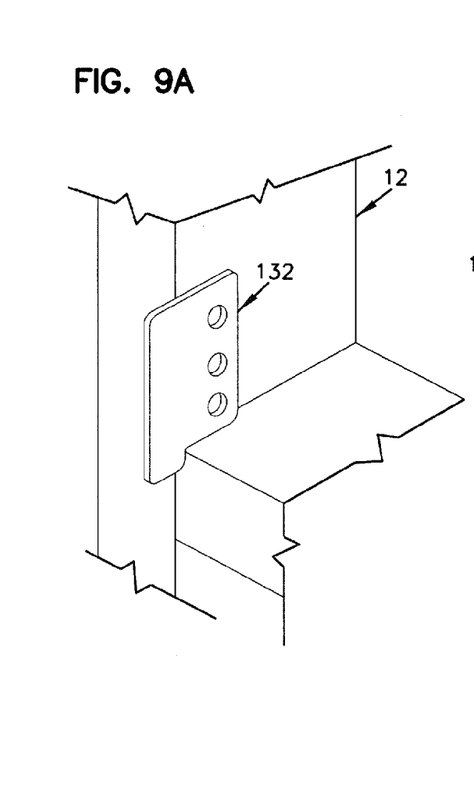
FIGS. 9A-9C are perspective views depicting a method of installation of an inrigger of the light shelf of FIG. 1.
Figure 9B:
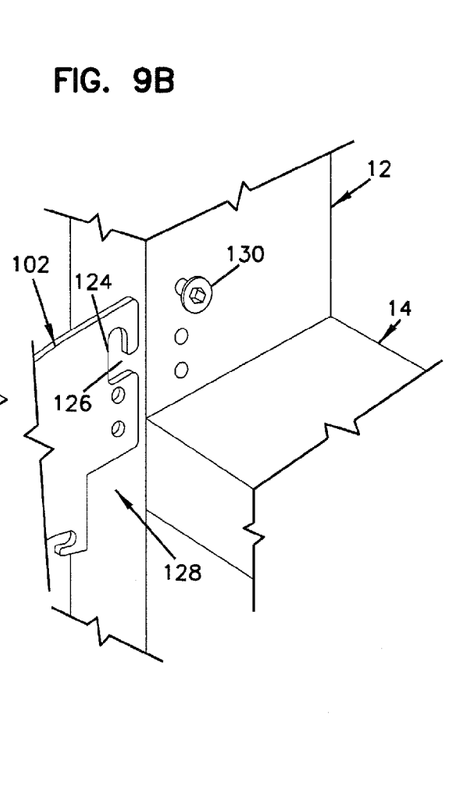
Figure 9C:
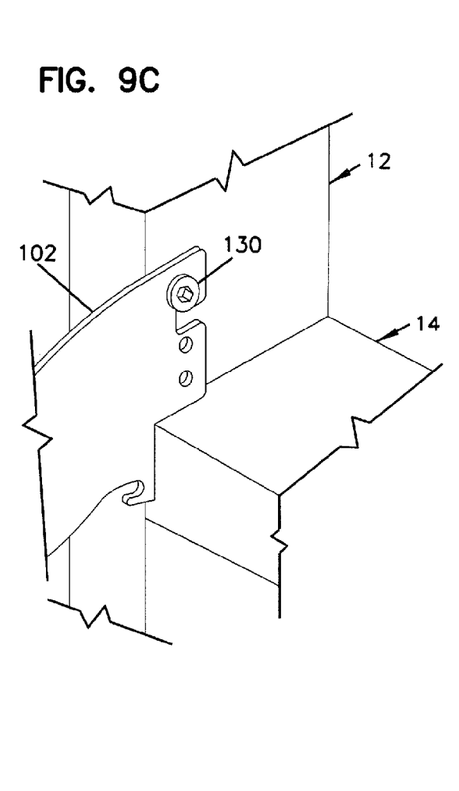

The support end 108 of the inrigger 102 may include a fastening mechanism for fastening the inrigger 102 to a wall, ceiling, floor, glazing system, or other supporting structure. As shown, the fastening mechanism may include perforations 122 for penetration thereof by screws, bolts, pins, or other fasteners. As shown, the fastening mechanism may be a quick attachment fastening mechanism where one of the perforations 122 may be a slot having a vertically extending portion 124 and a horizontally extending portion 126 passing through the support end 108 of the inrigger 102. In addition, a mounting notch 128 may be provided on the lower portion of the inrigger 102. As such, and as shown in FIGS. 9B & 9C, a first fastener 130 may be installed into a supporting structure and, in the case of a screw or bolt for example, the head of the fastener 130 may be maintained spaced apart from the supporting structure. The inrigger 102 may thus be initially supported by the single fastener 130 by sliding the inrigger 102 onto the fastener, the fastener passing along the horizontally extending portion 126 and then along the vertically extending portion 124. Once slid onto the fastener 130, the mounting notch 128 may rest against a horizontally extending mullion 14, for example, thereby securing the inrigger 102 temporarily until the remaining fasteners are installed. In some embodiments, a single perforation 122 may be provided, while in other embodiments, two, three, four, or more perforations 122 may be provided. In still other embodiments, the mounting notch 128 may not be present and the light shelf may be mounted at a vertical location clear of any wall system horizontal member. As shown in FIG. 9A, a template 132 for matching the layout of the holes 122 in the inrigger 102 may be provided and may include a mounting notch 128 that is substantially the same as the mounting notch 128 in the inrigger 102 thereby making the positioning of the template 132 quite simple. In the case of a single perforation 122 and a single fastener 130, a high friction device or system may be provided to allow the inrigger 102 to cantilever and not rotate about the fastener. This high friction system or device may include a toothed washer or abrasive type washer. In other embodiments, one or more surfaces of the inrigger 102 at the connection may be textured, roughened or otherwise configured to engage the support element.

Referring again to FIG. 3, the pan engaging edge 112 of the inrigger 102 may be configured for connection of the inrigger 102 to the pan 104 and may also allow for the pan 104 to pass across the inrigger 102 without interruption of the pan 104. As such, the pan engaging edge 112 may include a contour adapted to accommodate the profile of the pan 104. As shown, the pan 104 may include a wave profile having crests and valleys and the pan engaging edge 112 may have a similar wave profile. Other profiles of the pan 104 may also be provided, such as, for example, angular peaks and valleys, single waves or troughs extending from one side of the pan 104 to the other, alternating channels and hats, or other cross-sectional profiles. In any of these cases, the pan engaging edge 112 may include a profile for accommodating the pan profile and may include a similar profile.

The pan engaging edge 112 may include interrupting edges 134 creating relatively abrupt interruptions in the otherwise continuous wave profile. The interrupting edge 134 may extend generally perpendicular to pan engaging edge 112 and may create a stepped profile. As such, when the pan 104 is positioned adjacent the pan engaging edge 112 of the inrigger 102, a cavity or gap may be provided on the inrigger side of the pan 104 allowing space for a connection between the inrigger 102 and the pan 104.

Figure 4:
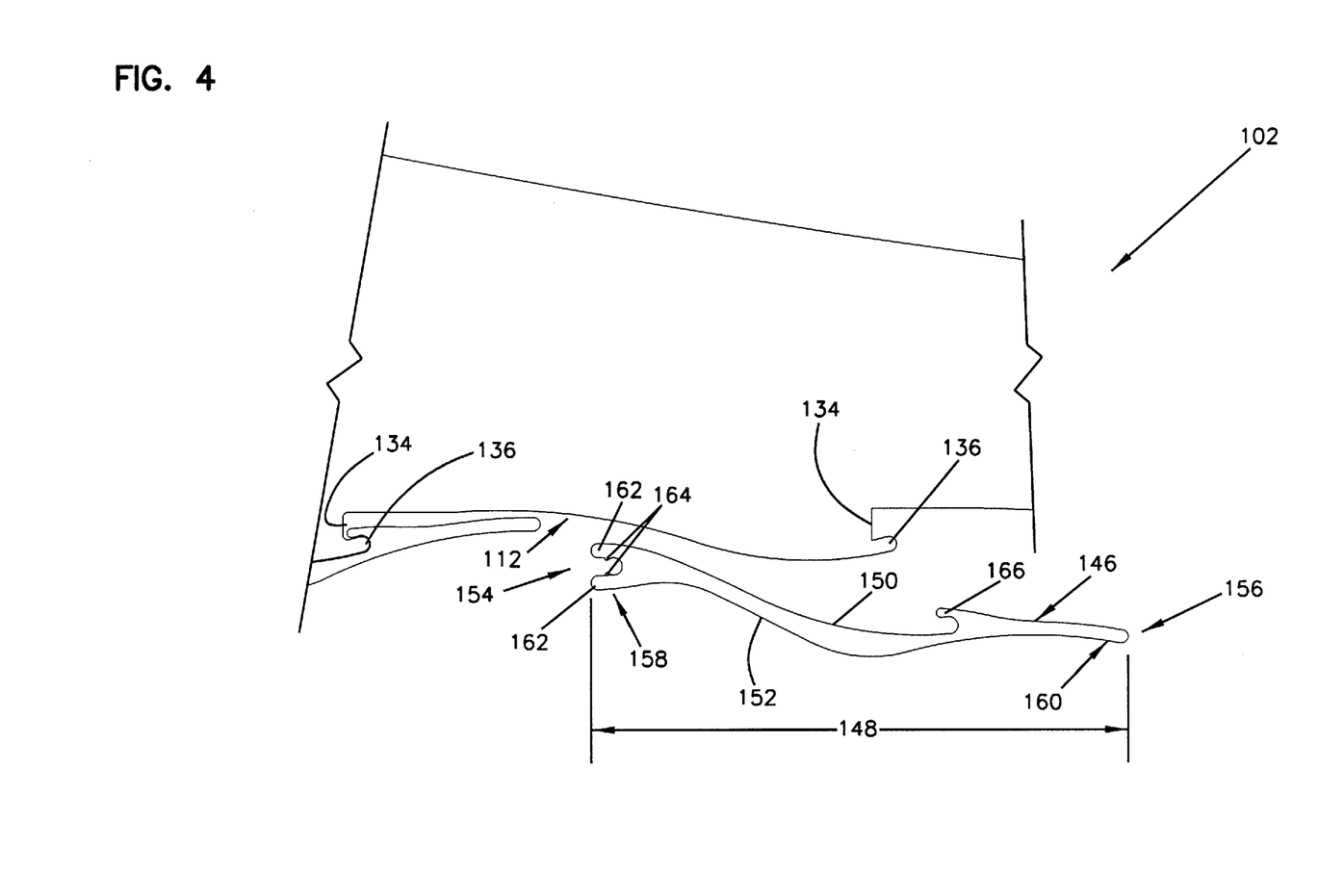
FIG. 4 is a close-up view thereof.

Referring to FIG. 4, a connection feature 136 may be provided on the pan engaging edge 112 and may be configured for engagement with the pan 104. The connection feature 136 may include a perforation, recess, hook, tab, protrusion, or other fastener. In the embodiment shown, the connection feature 136 is in the form of a tongue-like ledge 136 extending from and generally perpendicular to the interrupting edge 134 and adapted for engagement with a groove or slot 166 on the pan 104. The tongue-like ledge 136 may have a bulb-like shape so as to be inserted, and in some embodiments snappingly inserted, into the groove feature 166, which may include a slightly closed mouth or a more open mouth may be provided. In other embodiments, a screw may be used to fasten the pan to the inrigger. Where the tongue-like ledge 136 is bulb-like and the groove 166 is slightly closed, the groove feature 166 may be pressed onto the tongue-like ledge 136 causing the mouth of the groove 166 to open slightly. When the groove feature 166 is pressed fully onto the ledge 136, the mouth of the groove feature 166 may pass over the bulb-like shape and snappingly or firmly engage the ledge 136. In other embodiments, the groove 166 and ledge 136 may fit more loosely together.

While the tongue-like ledges 136 have been described as extending from the inrigger 102, the opposite may alternatively or additionally be provided. That is, in other embodiments, a bulb-shaped connection feature may be provided on the pan 104 and may be configured and arranged to engage a grooved recess on the inrigger 102. In still other embodiments, threaded bores may be provided on the inrigger 102 and the pan 104 may be secured thereto with bolts. In still other embodiments, screws, self-tapping screws, or self-drilling screws may be used. Other fasteners may also be provided. In still further embodiments, threaded shafts or studs may extend from the inrigger 102 and pass through perforations in the pan 104 allowing nuts to be threaded onto the studs to secure the pan 104.

Referring again to FIGS. 3 and 4, the pan engaging edge 112 may include a plurality of tongue-like ledges 136 for supporting the pan at several points along the length of the inrigger 102. In some embodiments, the pan engaging edge 112 may include a first or starter tongue-like ledge 136A at the support end 108, a second tongue-like ledge 136B spaced a starter distance 138 therefrom, and remaining tongue-like ledges 136C consecutively spaced at a slat distance 140. The relevance of these spacings will become more clear during the description of the pan and the installation described below.

In addition, the inrigger 102 may include an additional connection feature 142 positioned near the free end 110 of the inrigger 102. For example, a bore 142 may be provided as shown extending into the inrigger 102 from the pan engaging edge for securing the pan 104 to the inrigger 102. This connection feature 142 may be the same or different than the other connection features 136 on the pan engaging edge 112. This connection feature 142 may be referred to as the locking connection feature 142 because it may function to lock the pan 104 in place as will be described more fully with respect to the installation of the pan 104.

With continued reference to FIG. 3, the inrigger 102 may also include a cap connecting feature 144 positioned near its free end. The cap connecting feature 144 may be configured for connection of trim element 106 to the inrigger 102 for support thereof. As shown in FIG. 3, the cap connecting feature 144 may include a recess on the free edge 114 of the inrigger near the free end 110 and an additional recess on the pan engaging edge 112 near the free end 110. The recesses 144 may be configured for receiving nesting bulbs 176 on the trim element 106 and for seated placement therein. Other cap connection features 144 may be provided similar to the alternatives listed for the connection features 136 on the pan engaging edge 112. Caps may also be connected with screws or other fasteners and a combination of these connection features may be provided.

Turning now to the pan 104, continued reference to FIGS. 3 and 4 is made. The pan 104 may be configured to span between the inriggers 102 and for uninterrupted support by the inriggers 102. The pan 104 may further be adapted for receiving and reflecting natural or artificial light imparted on an incident surface thereof. The pan 104 may be a single piece or it may be comprised of several pieces. In some embodiments, as shown in FIGS. 1, 2, and 3, the pan 104 may include a plurality of elongate slats 146 joined together to form a substantially continuous pan 104. While the top surface may be any shape, the wave shape, or other diffusing or distributing shape, of the elongate slats 146 and pan 104 may be provided on the top side for reflective purposes. The bottom side may be flexibly configured to any shape depending on the aesthetic appearance desired.

The elongate slats 146 of the pan 104 may be relatively thin planar elements having a relatively narrow width 148 compared to an overall width of the pan 104. Each slat 146 may have a cross-sectional profile defining a portion of the overall profile of the pan 104 such that when placed adjacent one another, the full pan 104 is formed. In some embodiments the slats 146 may each be the same and thus form repeating portions of the overall pan 104 profile. In other embodiments, the cross-sectional profiles of some of the slats 146 may be different. As shown, the pan 104 may include a wave profile and a plurality of slats 146 placed adjacent to one another may create the wave profile of the pan 104. In this embodiment, each of the slats 146 is the same as the adjacent slat 146. As discussed with respect to the pan engaging edge 112 of the inrigger 102, alternative pan profiles may be provided.

Focusing now on FIG. 4, the slats 146 may include a cross-sectional wave profile defining an incident surface portion 150 and an opposite surface 152 joined by opposite longitudinally extending lateral edges 154, 156. The longitudinally extending lateral edges 154, 156 may include engagement features 158, 160 positioned thereon. In some embodiments, the slats 146 may be extruded and, as such, the cross-sectional wave profile may be substantially constant along the full length of the slat 146. Accordingly, the engagement features 158, 160 may also extend the full length of the slat 146. The slat may include a female engagement feature in the form of a groove 158 along one edge 154 and a male engagement feature on the opposite edge 156 in the form of a tongue 160. The groove 158 may be configured to receive a tongue 160 of an adjacent slat 146 and, as such, repeating adjacent slats 146 may be combined to form the pan 104.

As shown in FIG. 4, the groove 158 may extend into the slat 146 from the longitudinally extending edge 154. The groove may be defined by two laterally extending and substantially parallel jaws 162. The groove 158 may have a receiving depth for receiving the tongue of an adjacent slat 146. The receiving depth may be defined by the position of two opposing stops 164 extending into the groove 158 space from each of the parallel jaws 162. Beyond the stops 164, the groove 158 may have additional depth and the base of the groove 158 may be generally arcuate shaped. The additional depth of the groove 158 beyond the stops 164 may provide for additional flexibility in the jaws 162 and yet the stops 164 may prevent over insertion of the tongue 160 of an adjacent slat 146.

The tongue 160 may be shaped to fit within the groove 158. In some embodiments the tongue 160 may include a rounded edge. In other embodiments the tongue 160 may be a squared off edge, a pointed edge, or another shaped edge. In still other embodiments, the tongue 160 may be similar to that found on common tongue and groove connections where the thickness of the material is necked down a thickness similar to the parallel extending jaws 162 of the groove 158, for example. In this embodiment, when the tongue 160 is inserted in the groove 158, the surface of the slat 146 having the tongue 160 may be substantially continuous with the outer surface of the parallel extending jaws 162 on either side of the groove 158. Other shaped tongues 160 may be provided.

In some embodiments, the groove 158, the tongue 160, or both may include anchoring mechanisms configured for securing the tongue 160 in the groove 158. The anchoring mechanisms may include rearward directed (i.e., relative to the respective directions of joining the tongue and the groove) teeth or fins. In this embodiment, as the tongue 160 is inserted into the groove 158, the teeth or fins may allow for smooth insertion. However, when trying to remove the tongue 160 from the groove 158, the teeth or fins may bite into the respective tongue 160 or groove 158 thereby resisting separation. In other embodiments, roughened surfaces in the form of ribs, bumps, or other surface textures may also be used. In some embodiments, an adhesive or glue may be applied to the tongue 160 or the groove 158 prior to securing the tongue 160 in the groove 158. Other adhesive mechanisms may also be used. In other embodiments, like that described with respect to the tongue-like ledges 136 on the pan engaging edge 112 of the inrigger 102, the tongue 160 may be somewhat bulb shaped so as to snappingly or firmly engage the groove 158 and resist removal therefrom.

In some embodiments, sound attenuating material may also be provided. That is, for example, a padding, lining material, caulk, or rubber-like material may be provided on the tongue 160 or within the groove 158 to damp any vibration due to air currents or other building vibrations imparted on the light shelf. For example, when building mechanical systems such as heating or air conditioning turn on and off, initial abrupt pressure and air current changes or continuous air pressures or currents can lead to vibration of building components. The sound attenuating material may resist or reduce the associated vibration of the light shelf 100.

The slats 146 may each also include an inrigger connecting feature 166 for engaging the pan engaging edge 112 of the inrigger 102. These connecting features 166 may correspond to the connection features 136 provided on the pan engaging edge 112. That is, where a bore is provided on the inrigger 102, for example, a threaded rod or toothed shaft may be provided on the slat 146 or a perforation for receiving a fastener may be provided. As shown in FIG. 4, the inrigger connecting feature 166 may include a hook 166 extending from the incident surface of the slat 146. The hook 166 may be grooved shaped to receive the tongue-like ledge 136 on the pan engaging edge 112 of the inrigger 102. The hook 166 may be formed similar to the grooves 158 described with respect to the longitudinally extending edges 154,156 of the slats 146. Here, however, the hook 166 may include a single jaw extending slightly upward from the incident surface 150 of the slat 146 and turning to extend generally parallel to the incident surface 150 forming the groove. As discussed with respect to the tongue-like ledge 136, the jaw of the hook 166 and incident surface 150 may form a groove mouth and may be adapted to tightly receive the tongue-like ledge 136 on the pan engaging edge 112 or more loosely receive the ledge 136. As with the tongue 160 and groove 158 features on the longitudinally extending edges 154, 156 of the slats 146, one or more anchoring mechanisms and sound attenuating devices may be provided where the slats 146 are connected to the inrigger 102.

The slats 146 of the pan 104 may be aluminum, steel, alloy, or other metal materials. In other embodiments, the slats 146 may be plastic, composite, wood, concrete, glass, or fiber glass. Other materials may also be used. The incident surface portion 150 of the slats 146 that forms the incident surface of the pan 104 may be finished with a substantially reflective material, such as a light colored paint. In some embodiments, the finish material may be a baked enamel finish. The baked enamel finish, for example, may include acrylic and fluoropolymer resins. Other acrylic, polyester, or urethane coatings including powder coating may also be used. Other finishing processes and materials may also be used such as applied adhesive wraps, dipped coatings, plating, and the like. Still other processes and materials may be used.

In certain embodiments, the light shelf 100 can be used to provide additional artificial light, such as by containing a fluorescent, incandescent, halogen, LED, or other light bulb inside an interior space within the light shelf. In these embodiments, the light shelf 100 may be hollow, with the interior adapted to contain light bulbs. The artificial light may be distributed into the living or office space through an upper layer of the shelf 100 that allows light transmission, while the lower layer of the shelf is opaque. For example, in one embodiment, the uppermost layer functions as a one-way mirror, so that the artificial light from inside the light shelf is transmitted through the uppermost layer and into the living or office space, while natural light is further reflected from the upper portion of the mirror-like surface on top of the light shelf 100 into the living or work space. In another embodiment, the interior bottom surface inside the light shelf 100 that faces upward may be reflective and the top layer of the light shelf may be transparent, so that the opaque bottom inner surface reflects both natural and artificial (when the bulbs are illuminated, which can be done manually or with a sensor) light upwardly, through the transparent or translucent uppermost layer of the light shelf. In this manner, the light shelf may allow artificial lighting to supplement natural light, as desired.

Artificial lighting can also be placed adjacent to the light shelf with the light then reflected upward. The incident surface portion 150 could also contain solar pickup strips (collectors) to store energy for other uses such as powering artificial lighting.

Having described the inriggers 102 and pan 104, reference can be made to FIG. 3 for a discussion of an installation procedure. As shown, the inrigger 102 may be positioned to extend inwardly from a building surface. A first slat 146A may be positioned along the pan engaging edge 112 of the inrigger 102 and oriented across the pan engaging edge 112 generally perpendicular to the inrigger 102 and adjacent and parallel to the plane of the pan engaging edge 112. A groove shaped engagement feature 158 on the longitudinally extending edge 154 of the slat 146A may be secured to the starter connection feature or tongue-like ledge 136A on the inrigger 102. The inrigger connecting feature 166 on the slat 146A may be engaged with the second connection feature or tongue-like ledge 136B. As shown, the remaining slats 146B and last slat 146C may be installed consecutively by engaging their respective groove engagement features 158 with the tongues 160 of the preceding slat 146 and engaging their respective inrigger connecting features 166 with the tongue-like ledges 136C along the pan engaging edge 112 of the inrigger 102. When the last slat 146C is positioned against the pan engaging edge 112 of the inrigger 102, the locking connection feature 142 may be used to secure the last slat 146C into place and prevent lateral movement thereof. This locking connection feature 142 may function to prevent lateral movement of the last slat 146C and thereby lock all of the slats 146A-C into place preventing separation thereof and maintaining their respective engagement with adjacent slats and further maintaining their connection to the inrigger 102. The locking connection feature 142 may also reduce the potential for noise from HVAC air pressure changes.

The length 120 of the inrigger 102 may be selected based on the size of the light shelf 100 desired and the lengths 120 may be selected from the ranges described above or other lengths 120 may be used. In some embodiments, the length 120 of the inrigger 102 may be coordinated with the width of the slats 146 used to form the pan 104. For example, where the distance between the starter connection feature 136A and the locking connection feature 142 is approximately 24", four slats 146 that are each 6" wide may be used. In some embodiments, where longer or shorter inriggers 102 are used, wider or narrower slats 146 may be used and the same number of slats 146 may be provided. Alternatively, the same width of slat 146 may be provided and more or fewer of them may be used. In still other embodiments, varying width slats 146 may be used. This may be particularly beneficial to accommodate inrigger lengths 120 not divisible by an available slat width. For example, where an inrigger 120 is provided with a 26" dimension between the starting connection feature 136A and the locking connection feature 142, and only 4" and 6" slats 146 are available, three 6" slats 146 and two 4" slats 146 may be provided to form the pan 104. In these embodiments, the tongue-like ledges 136 on the pan engaging edge 112 of the inrigger 102 may be coordinated with the slat locations such that all connection features align.

Figure 5:
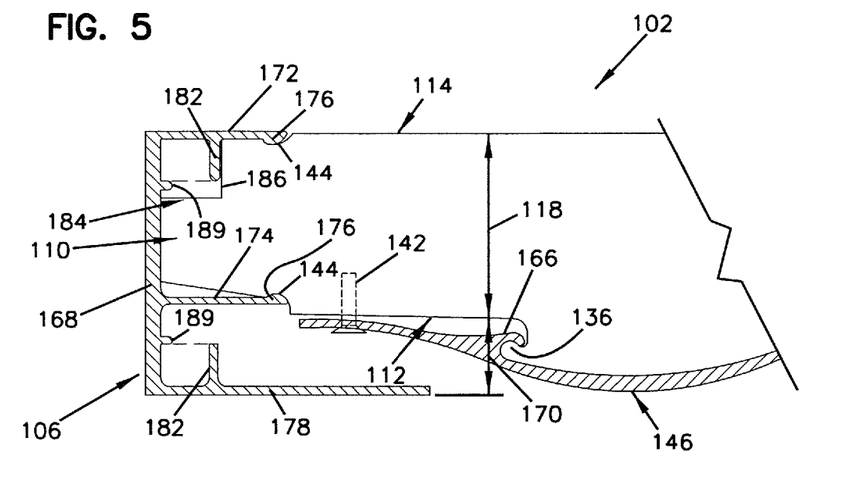
FIG. 5 is a cross-sectional view of the light shelf of FIG. 1 taken along line 5-5 of FIG. 2.
Figure 6:
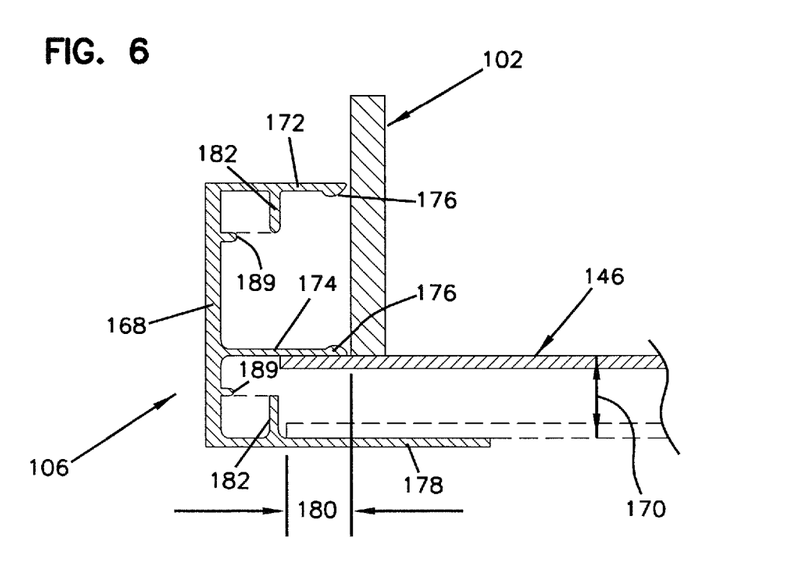
FIG. 6 is a cross-sectional view of the light shelf of FIG. 1 taken along line 6-6 of FIG. 2.

Turning now to FIGS. 5 and 6, a trim element 106 in the form of an edge cap 106 may be described. The edge cap 106 may be configured for providing a clean finished edge on the light shelf 100. In FIG. 5, the edge cap 106 is shown on the front edge of the light shelf 100 and is configured for support by the inriggers 102. In FIG. 6, the edge cap 106 is shown on the end edge of the light shelf 100 and is configured for support by a cantilevered portion of the pan 104. As shown, the edge cap 106 used on the front edge may be the same as that used on the end edge and, as such, may be configured for attachment to the light shelf 100 in one or both conditions. The edge cap 106 used on the front edge could also terminate at an obstruction such as a column or wall.

With particular reference to FIG. 5, the edge cap 106 may include a fascia closure plate 168 configured for placement on edge and positioning along the free ends 110 of a plurality of inriggers 102. The fascia closure plate 168 may have a height substantially equal to the total thickness of the light shelf 100 at the free end 110. That is, the height may be substantially equal to the width 118 of the inrigger profile at the free end 110 plus the thickness 170 of the pan profile. The fascia closure plate 168 may be relatively thin and may have a plurality of tabs, plates, and other feature extending from one side thereof. The fascia closure plate 168 surface may have other shapes or sight lines for aesthetic purposes. The height of the fascia closure plate 168 may also selectively vary.

The edge cap 106 may also include two laterally extending clips 172, 174. The laterally extending clips 172, 174 may be configured for engaging the free end 110 of the inrigger 102 and particularly for engaging the recesses 144 on the free edge 114 and the pan engaging edge 112 of the inrigger 102. As such, the clips 172, 174 may extend laterally from the fascia closure plate 168 to a distance substantially equal to the distance from the free end 110 of the inrigger 102 to the recesses 144. The clips 172, 174 may be spaced apart from one another a distance substantially equal to the inrigger profile width 118 at the free end 110. In some embodiments, one of the laterally extending clips 172 may be positioned at an edge of the fascia closure plate 168 and may be referred to as an outer clip 172. This outer clip 172 may be engaged with the recess 144 on the free edge 114 of the inrigger 102. The other clip 174, or inner clip 174, may be engaged with the pan engaging edge 112 of the inrigger 102 and the remaining portion of the fascia closure plate 168 may extend beyond this other clip 174. The clips 172, 174 may also include nesting bulbs 176 positioned at their ends for engaging the recesses 144 on the inrigger 102. Accordingly, as the edge cap 106 is pressed onto the free end 110 of the inrigger 102, the laterally extending clips 172, 174 may be deflected away from one another to accommodate the nesting bulbs 176 passing along the free edge 114 and pan engaging edge 112 of the inrigger 102. Once the edge cap 106 is pressed fully onto the inrigger 102, the bulbs 176 may nestingly engage the recesses 144 thereby relaxing the deflection of the clips 172, 174 and snappingly or firmly engaging the edge cap with the inrigger 102. The depth of the recess 144 and the size of the nesting bulb 176 may be selected to allow for a relatively flush transition from the clips 172, 174 to the inrigger 102.

With continued reference to FIG. 5, the edge cap 106 may also include a soffit closure plate 178. The soffit closure plate 178 may be configured for secluding the clip connection to the inrigger 102 and the locking connection feature 142 of the pan 104 to the inrigger 102. As such, the soffit closure plate 178 may extend laterally from the fascia closure plate 168 in spaced apart relationship with the laterally extending clips 172, 174. The soffit closure plate 178 may have a laterally extending length exceeding the clips 172, 174 and may be approximately twice as long as the clips 172, 174, for example. Other soffit closure plate lengths may be provided including lengths that are shorter than the clip length.

As shown in FIG. 6, the soffit closure plate 178 may extend from an edge of the fascia closure plate 168 opposite that of the outer clip 172. As also shown, the spacing between the inner clip 174 and the soffit closure plate 178 may be substantially equal to the profile thickness 170 of the pan 104. In an end condition of the shelf 100 as shown, the pan 104 may extend beyond the end of the end most inrigger 102 by a cantilever distance 180 and the pan 104 may support the edge cap 106 by being received in the space between the inner clip 174 and the soffit closure plate 178. In some embodiments, the space between the inner clip 174 and the soffit closure plate 178 may be slightly smaller than the profile thickness 170 of the pan 104 thereby providing for a snug fit. The cantilever distance 180 of the pan 104 may be ½", for example. Other cantilever distances 180 may range from approximately ¼" to approximately 6". In other embodiments, the cantilever distance 180 may range from approximately ⅜" to approximately 1". Other cantilever distances 180 outside the ranges mentioned may also be provided.

The cantilever distance 180 may be selected to accommodate the dimensions of the cap 106. For example, as shown in both FIGS. 5 and 6, a stop tab 182 may extend inwardly from the outer clip 172 and the soffit closure plate 178. The stop tabs 182, as shown in FIG. 6, may provide a stopping point for the cap 106 when slid onto the ends of the slats 146 of the pan 104 preventing the pan 104 from extending all the way to the fascia closure plate 168. Similarly, in FIGS. 3 and 5, the stop tab 182 may provide a stopping point for the cap 106 when clipped onto the ends of the inriggers 102. As shown, in FIG. 5, the free end 110 of the inrigger 102 may include a notch 184 defining an abutment edge 186 against which the stop tab 182 may be engaged. Referring again to FIG. 6, and with further regard to the cantilever distance 180, the distance 180 may be configured to allow the clips 172, 174 to align with an outer face of the inrigger 102 when installed. As such, the cantilever length 180 of the pan 104 may be substantially equal to the length of the laterally extending clips 172, 174 less the distance from the fascia closure plate 168 to the stop tab 182. This may allow the tip of the clips 172, 174 on the cap 106 to be positioned immediately adjacent the face of the inrigger 102 as shown.

Figure 7:
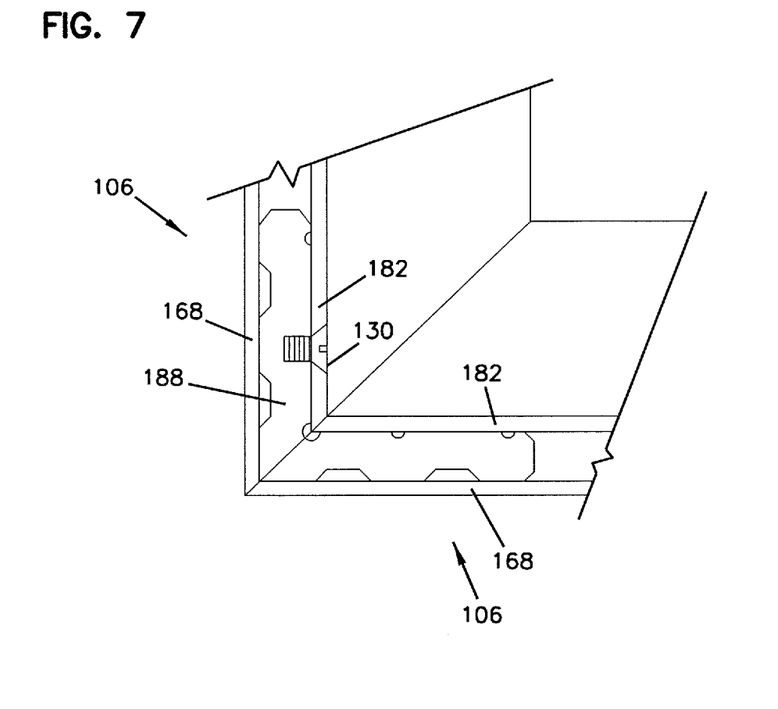
FIG. 7 is a top detail view of the intersection of a front cap and end cap of the light shelf of FIG. 1 taken at detail 7 of FIG. 2.

The front edge and end edge cap 106 may intersect with one another at the corners of the light shelf 100. The light shelf 100 may include corner keys 188 configured for maintaining the alignment of the edge caps 106 in the intersecting condition. A top view of the intersection of the edge caps 106 is shown in FIG. 7. As shown, the corner key 188 may be generally L-shaped where a 90 degree corner is provided. Other shaped corner keys 188 may be provided where the corners vary from 90 degrees. As shown, the corner key 188 may have a width substantially equal to the distance from the fascia closure plate 168 to the stop tabs 182 of the cap 106. A first leg of the corner key 188 may be positioned between the fascia closure plate 168 and the stop tab 182 of the front edge cap 106 and a second leg of the corner key 188 may be positioned between the fascia closure plate 168 and the stop tab 182 of the end edge cap 106. As such, the front edge cap 106 and end edge cap 106 may be held in alignment with one another. One or more corner keys 188 may be provided. In some embodiments, two corner keys may be used.

As can be best seen by referring to FIGS. 5 and 6, a first corner key 188 may be positioned in an upper corner pocket and a lower corner key 188 may be positioned in a lower corner pocket. Corner keys 188 may each be secured with a fastener 130. To further provide a secured position for the corner key 188, the edge cap 106 may include a key nub 189 associated with each corner pocket. The key nubs 189 may be spaced from the outer clip 172 or soffit closure plate 178 a distance substantially equal to the thickness of the corner key 188. As such, once placed into the end of an edge cap 106, the corner key position may be maintained by the stop tab 182, the key nub 189, and may be secured with a fastener 130.

The corner key 188 may be constructed of a somewhat rigid material such as aluminum, steel, alloy, or other metal or non-metal material. As such, when inserting the corner key 188 into the ends of the edge caps 106, the corner key 188 may be press fit therein and the rigid nature of the material may allow for continued secured position in the edge caps 106 over the life of the device. Other materials may also be used.

The edge cap 106 may be aluminum, steel, alloy, or other metal materials. In other embodiments, the edge caps 106 may be plastic, composite, wood, concrete, glass, or fiber glass. Other materials may also be used.

The slats 146 of the pan 104 may span between and across the pan engaging edge 112 of one or more inriggers 102. The inrigger spacing for supporting the pan 104 may be configured to accommodate the architectural arrangement of the building space and may also be based on the ability of the pan 104 to span the distance therebetween. For example, the inriggers 102 may be spaced distances corresponding to vertical mullion locations of a curtainwall or storefront system. In addition, the inrigger spacing may be adapted to accommodate obstructions such as vertically extending columns, piping, ductwork, or other items. In some embodiments, the spacing of the inriggers 102 may range from approximately 6" to approximately 16'. In other embodiments, the inrigger spacing may range from approximately 2' to approximately 12'. In still other embodiments, the inrigger spacing may range from approximately 4' to approximately 10'. Still other inrigger spacings may be provided and spacings outside the ranges mentioned may also be provided.

In some circumstances, the overall length of the light shelf 100 may exceed the length of the available slats 146. That is, the slat length may range from approximately 4" to approximately 36'. In other embodiments the slat length may range from approximately 2' to approximately 12'. In still other embodiments, the slat length may range from approximately 10' to approximately 24'. Other slat lengths outside the ranges provided may also be provided. The overall length of the light shelf 100 may have dimensions similar to common interior room dimensions. In some circumstances, for example auditoriums, gymnasiums, classrooms, or other gather type spaces, the room dimensions can be quite large. Accordingly, in these circumstances, multiple slats 146 may be spliced together to accommodate light shelf lengths that exceed the length of the slats 146.

Figure 8:
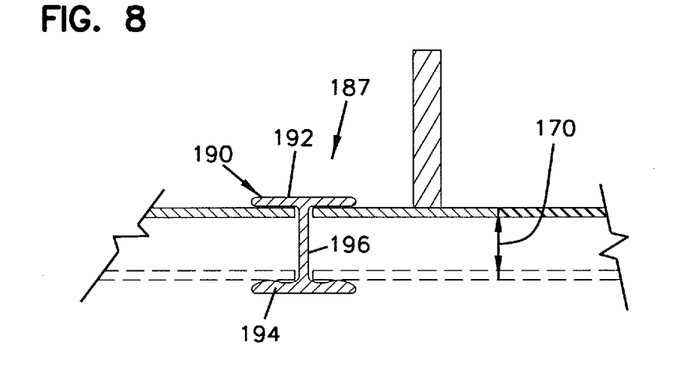
FIG. 8 is a cross-sectional view of the light shelf of FIG. 1 taken along line 8-8 of FIG. 2.

As shown in FIG. 2, in some embodiments, a splice mechanism 190 may be provided adjacent to the inrigger 102 to support a slat splice 187. In other instances, the splice 187 may occur at any location mid-span. Where the splice mechanism 190 is located adjacent to the inrigger 102, slats 146 extending from one side of an inrigger 102 may cantilever past the inrigger 102 a relatively short distance such as, for example, 2 inches, 4 inches, or 6 inches. Other cantilever distances may also be provided. At the end of the cantilevered slats 146, a splice mechanism 190 may be provided. Referring to FIG. 8, the splice mechanism 190 may be an I-shaped member configured with an upper and lower flange 192, 194 and a web 196 extending therebetween. The I-shaped splice member 190 may have a height substantially equal to the profile thickness 170 of the pan 104 or slightly less to provide for a snug fit. The I-shaped splice member 190 may be positioned on the end of the cantilevered slats 146 and the ends of additional slats 146 may be placed in the other side of the I-shaped splice member 190 and may extend to or beyond the nearest inrigger 102. The flanges of the I-shaped splice member 190 may have a width ranging from approximately ¼" to approximately 12". In other embodiments, the flange width may range from approximately 1" to approximately 6". In still other embodiments the flange width may be approximately 2".

While a slat splice 187 with a splice mechanism 190 may be provided as shown and described, in some embodiments, the splice location of the slats 146 may instead be staggered. That is, similar to the staggered location of board splices in a tongue and groove wood floor system, the slats 146 may have staggered splice locations and may rely on adjacent slats 146 for transferring loads around the splice. In this embodiment, the splice locations of any given slat 146 may be maintained in a close position to supporting inriggers 102 to avoid imparting excess bending stresses in adjacent slats 146. In addition, splices in adjacent slats 146 may be arranged so as to be at opposite ends of bays between inriggers 102 or on opposing sides of inriggers 102. This arrangement of splice locations may allow the pan 104 to act as a substantially continuous pan 104 and may reduce the effect of the splice locations.

In some alternative embodiments, the suspension system 102 may be omitted and the pan 104 of the light shelf 100 may be self-supporting. For example, the light shelf 100 may be connected to a support structure continuously or intermittently along a wall or glazing system. The connection may be a moment resisting connection such as, for example, where a down-turned leg of the pan 104 extends along the wall and is screwed or bolted thereto. In this embodiment, the tongued and grooved slats 146 may include extended depth grooves 158 and tongues 160 to allow the slats 146 to cantilever off of adjacent slats 146. In other embodiments, the slat nearest the glazing may be tipped upward allowing consecutive slats 146 to droop slightly forming a convex incident surface. In still other embodiments, the pan 104 may not be formed from slats 146 and may be a single piece that is lifted into place and secured to the wall, glazing or other support.

The daylighting device described may be used alone or it may be supplemented with artificial light for concurrent use or for use during non-daylight hours. For example, in some cases light fixtures may be provided on the daylighting device and activated when natural light is not present or is insufficient. In some embodiments, for example in the case of a shelf 100 such as that described above, the fixtures may be placed on an upper surface of the shelf 100 directed upward and activated to provide indirect artificial lighting when natural light is not available or is insufficient. In other embodiments, the fixtures may be positioned below the shelf 100, on the sides of the shelf 100, or near an edge of an upper surface of the shelf 100 and may provide direct artificial lighting when natural light is not available or is insufficient. In still other embodiments, the pan 104 may be configured like a one way mirror and the fixtures may be positioned on an underside of the shelf 100, but directed upward. In this embodiment, the artificial lighting may shine through the pan 104 and upward to provide indirect lighting, while the fixtures may not obstruct the use of the shelf during daylight hours. In this embodiment, as with the others described, the artificial lighting may be used when natural light is not available or as a supplement thereto.

The present system may be advantageous over previous light shelf systems for several reasons. The wave shaped profile may provide a reflective surface creating a softer interior lighting effect due to the varied incident angle of the surface relative to the incoming light. That is, for example, as incoming light encounters the incident surface of the light shelf, the reflected angle relative to the shelf depends on the location of the pan that the light encounters. That is, where the light encounters the crest of a wave the light may be reflected similarly to a flat light shelf surface where the incident angle of the light relative to the shelf is substantially equal to the reflection angle of the light relative to the shelf. This is because the wave crest may be generally parallel to the orientation of the light shelf. However, where the incoming light encounters another portion of the wave profile, the reflected light may be reflected in a different direction relative to the light shelf orientation. In these cases, while the incident angle of the light relative to the particular surface the light is incident on will be substantially equal to the reflection angle of the light relative to the particular surface, the reflection angle of the light relative to the light shelf as a whole will be different. As such, the incoming light may be dispersed over a greater area, deeper into the interior space of a building structure, and in a much softer manner.

Another advantage of the disclosed light shelf relates to the slats of the pan being configured to pass across the inriggers. For example, with current light shelf systems with sheet type pans, support is often provided along all edges of the sheet. As such, where an obstruction is encountered, it is common to stop the light shelf short of the obstruction and provide a support member at the nearest location short of the obstruction. As such, the light shelf or shelves in a building space may often be interrupted by obstructions requiring multiple and separate shelves to be installed. The system disclosed herein, allows obstructions to be handled by placing an inrigger near an obstruction and running the slats past the inrigger and into abutting relationship with the obstruction. Where the obstruction extends into a space a distance less than the length of the inriggers, the slats positioned inwardly from the obstruction may pass by the interior surface of the obstruction thereby allowing the light shelf to be substantially continuous around the obstruction. This is advantageous for purposes of installation, material, and general continuity of the shelf which can be beneficial from a lighting standpoint as well as an architectural standpoint.

Still another advantage of the disclosed system relates to the slat type pan construction. The tongued and groove edges on the slats may allow for more quickly finishing the pan pieces. That is, since there is some overlap in slats where the tongue is positioned in the grooved portion of an adjacent slat, less care may be provided in assuring that the edges of the slats are fully covered with paint or other finishing material since the tongue edge is secluded. The tongue and groove configuration also integrates slats together for ease of installation, structural integrity, and uninterrupted aesthetics.

Where the daylighting device is supplemented with artificial lighting, the wave profile of the pan may be advantageous for positioning of light fixtures on the underside of the pan. That is, the wave profile may allow fixtures to be positioned in the recesses in the underside of the pan formed by the upward extending portions of the wave profile. Moreover, the wave profile may be further advantageous for secluding power cords or other elements necessary for the fixtures to function.

In the foregoing description various embodiments of the present disclosure have been presented for the purpose of illustration and description. They are not intended to be exhaustive or to limit the invention to the precise form disclosed. Obvious modifications or variations are possible in light of the above teachings. The embodiments were chosen and described to provide the best illustration of the principals of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth they are fairly, legally, and equitably entitled.

What is claimed is:

1. An indirect daylighting device for a building with an interior space, comprising:
    a suspension system configured for securing the device to the interior of a building structure, the suspension system including an inrigger configured for connection to the building structure; and
    a pan secured to the suspension system, said pan comprising a reflective incident surface having a substantially continuous cross-sectional profile including a plurality of waves;
    wherein the device is configured to project the plurality of waves of the incident surface toward the inside of the building when secured thereto, such that the incident surface is arranged to receive natural light entering the building and to reflect the natural light to provide indirect lighting to the interior space of the building;
    wherein the inrigger includes a pan engaging edge having one or more pan connection features extending therefrom, the one or more pan connection features being sized and configured to secure the pan to the pan engaging edge; and
    wherein the pan includes one or more inrigger connecting features extending therefrom, the one or more inrigger connection features being sized and configured to secure the pan to the pan engaging edge by engaging with the one or more pan connection features.

2. The device of claim 1, wherein the inrigger is configured for cantilevered connection to the building structure.

3. The device of claim 2, wherein the pan engaging edge includes a profile corresponding to the cross-sectional profile of the pan.

4. The device of claim 3, wherein the pan passes across the pan engaging edge without interruption.

5. The device of claim 4, wherein the pan engaging edge includes an interrupting edge configured for connection of the pan thereto, wherein the one or more pan connection features extend from the interrupting edge.

6. The device of claim 5, wherein the one or more inrigger connecting features include a slot and the one or more pan connection features include a tongue-like tab configured for engaging the slot.

7. The device of claim 1, wherein the pan includes a plurality of elongated slats.

8. The device of claim 7, wherein each of the plurality of elongated slats includes longitudinally extending lateral edges having substantially continuous engagement features.

9. The device of claim 8, wherein the engagement features include a first engagement feature on a first longitudinally extending edge and a second engagement feature on a second longitudinally extending edge, the first and second engagement features being configured to engage respective second and first engagement features of adjacent slats.

10. The device of claim 9, wherein the first engagement feature is a tongue and the second engagement feature is a groove.

11. The device of claim 10, wherein the plurality of elongated slats are arranged adjacent to one another to form the incident surface.

12. The device of claim 2, wherein the inrigger includes a free end and a support end having a quick attachment fastening mechanism configured for initial support by a single fastener.

13. The device of claim 1, wherein said pan comprises an interior volume that contains an electrical lighting device.

14. The device of claim 1 wherein a projection of the plurality of waves of the incident surface is horizontal.

15. The device of claim 1 wherein a projection of the plurality of waves of the incident surface is adjustable.

16. An indirect daylighting device for a building with an interior space, comprising:
    a suspension system configured for securing the device to the interior of a building structure; and
    a pan secured to the suspension system and having a reflective incident surface and a cross-sectional profile forming a plurality of waves;
    wherein the device is configured to project the plurality of waves toward the inside of the building when secured thereto, such that the incident surface is arranged to receive natural light entering the building and to reflect the natural light to provide indirect lighting to the interior space of the building;
    wherein the suspension system comprises an inrigger configured for cantilevered connection to the building;

wherein the inrigger comprises a free end and a support end having a quick attachment fastening mechanism configured for initial support by a single fastener; and wherein the quick attachment fastening mechanism includes a slot in the inrigger having a vertically extending portion terminating in a horizontally extending portion passing through the support end of the inrigger and terminating at an outermost end thereof, the slot adapted for slipping around a portion of the single fastener.

17. The device of claim 16, wherein the quick attachment fastening mechanism includes a mounting notch adapted to rest against a horizontally extending mullion and prevent the inrigger from rotating about the single fastener.

18. An indirect daylighting device for a building with an interior space, comprising:

a suspension system configured for securing to a building structure; and a pan secured to the suspension system and having a reflective incident surface and a cross-sectional profile forming a plurality of waves;

wherein the incident surface is arranged to receive natural light entering a building and to reflect the natural light to provide indirect lighting to the interior space of the building;

wherein the suspension system comprises an inrigger configured for cantilevered connection to the building;

wherein the inrigger comprises a free end and a support end having a quick attachment fastening mechanism configured for initial support by a single fastener;

wherein a cap connecting feature is provided near the free end; and wherein the inrigger comprises a pan engaging edge and a free edge and the cap connecting feature comprises a recess on the pan engaging edge and the free edge;

further comprising a first elongate edge cap, the edge cap having a cross-section with first and second spaced apart laterally extending clips for engaging the cap connecting features on the inrigger and a spaced apart laterally extending cover plate.

19. The device of claim 18, wherein the first and second laterally extending clips include nesting bulbs for seated placement in the recess on the pan engaging edge and the free edge of the inrigger.

20. The device of claim 19, wherein the first edge cap is arranged generally perpendicularly to the inrigger and generally in the plane of the pan.

21. The device of claim 20, wherein the plurality of waves defines a pan thickness measured from crest to valley of the waves, the device further comprising a second elongate edge cap arranged parallel to the inrigger, wherein the laterally extending cover plate is spaced apart from the second laterally extending clip a distance substantially equal to the pan thickness defining a gap.

22. The device of claim 21, wherein the pan extends across and generally perpendicular to the inrigger and includes an end, wherein the gap of the second elongate edge cap receives the end of the pan and is supported thereby.

23. The device of claim 21, wherein the first and second edge caps include corner elements configured to align the edge caps at corners.

24. An indirect daylighting device for a building, comprising:

a suspension system configured for securing to a building structure and comprising a plurality of inwardly projecting inriggers; and a pan secured to an underside of the suspension system, said pan including a plurality of elongate slats interlockingly engaged with one another, extending substantially orthogonally to the inriggers, the interlockingly engaged slats joined together to form a cross-sectional profile comprising a plurality of waves, wherein the device is configured to project the plurality of waves toward the inside of a building when secured to the interior thereof.

25. An indirect daylighting device for a building having an exterior wall, the device comprising a plurality of elongate interlocking slats arranged to provide a substantially continuous incident surface for reflecting light, the plurality of slats having a cross-sectional profile comprising a plurality of waves, the plurality of slats arranged at a transom height of the wall and extending along the length of the wall, wherein light incident on the incident surface is reflected upward to illuminate a ceiling of the building.

26. The device of claim 25, wherein the substantially continuous incident surface comprises a wave-like surface.

27. The device of claim 26, wherein the plurality of slats each have substantially the same width.

28. The device of claim 25, wherein the interlocking engagement of the slats includes tongue and groove connections.

29. The device of claim 28, wherein the plurality of slats further comprise a connection feature extending along a length thereof for securing the slats to a suspension system.

30. The device of claim 29, wherein the suspension system comprises a plurality of inwardly projecting inriggers intermittently spaced along the length of the slats.

* * * * *